United States Patent
Rahm et al.

(10) Patent No.: US 12,542,291 B2
(45) Date of Patent: Feb. 3, 2026

(54) AIR MANAGEMENT SYSTEM AND A METHOD FOR CONTROLLING INTAKE AIR PRESSURE AND EXHAUST BACK PRESSURE OF A FUEL CELL SYSTEM

(71) Applicant: Volvo Truck Corporation, Gothenburg (SE)

(72) Inventors: Fredrik Rahm, Hörby (SE); Johan Lindberg, Gothenburg (SE); Carl Löwstedt, Onsala (SE)

(73) Assignee: Volvo Truck Corporation, Gothenburg (SE)

( * ) Notice: Subject to any disclaimer, the term of this patent is extended or adjusted under 35 U.S.C. 154(b) by 511 days.

(21) Appl. No.: 18/122,216

(22) Filed: Mar. 16, 2023

(65) Prior Publication Data
US 2023/0335765 A1    Oct. 19, 2023

(30) Foreign Application Priority Data
Apr. 19, 2022 (EP) .................... 22168820

(51) Int. Cl.
| | | |
|---|---|---|
| *H01M 8/04746* | (2016.01) | |
| *H01M 8/04111* | (2016.01) | |
| *H01M 8/0438* | (2016.01) | |
| *H01M 8/0444* | (2016.01) | |
| *H01M 8/04537* | (2016.01) | |

(52) U.S. Cl.
CPC .... *H01M 8/04753* (2013.01); *H01M 8/04111* (2013.01); *H01M 8/0438* (2013.01); *H01M 8/04761* (2013.01); *H01M 2250/20* (2013.01)

(58) Field of Classification Search
CPC ......... H01M 8/04753; H01M 8/04111; H01M 8/0438; H01M 8/04761; H01M 2250/20; H01M 8/0432; H01M 8/04492; H01M 8/04619; H01M 8/249; H01M 8/04455; H01M 8/04089; H01M 8/04694; H01M 8/04746; H01M 8/04201; H01M 8/0444;
(Continued)

(56) References Cited

U.S. PATENT DOCUMENTS

2008/0088043 A1    4/2008    Daisuke

FOREIGN PATENT DOCUMENTS

| CN | 114060292 A | 2/2022 |
|---|---|---|
| JP | 4701664 B2 | 6/2011 |

OTHER PUBLICATIONS

Extended European Search Report, EP 22168820.3, mailed Dec. 10, 2022, 34 pages.

*Primary Examiner* — Christian Roldan
(74) *Attorney, Agent, or Firm* — Sage Patent Group

(57) ABSTRACT

The present disclosure relates to an air management system and a method for controlling an intake air pressure and an exhaust back pressure of a fuel cell system. It further relates to an arrangement comprising a fuel cell system and such an air management system, and to a vehicle. The air management system includes an air pressurizing device arranged to feed intake air to an air compressor of the fuel cell system, a pressure regulating device arranged for regulating the exhaust back pressure, a pressure detection device for detecting an ambient air pressure, and a control device configured to control the air pressurizing device and the valve in dependence on the detected ambient air pressure, wherein the control device is configured to control the intake air pressure to a predetermined first pressure level, and to control the exhaust back pressure to a predetermined second pressure level.

20 Claims, 2 Drawing Sheets

(58) Field of Classification Search
CPC .... H01M 8/04776; B60L 58/30; B60L 50/70; Y02E 60/50; Y02T 90/40
USPC .......................................................... 429/444
See application file for complete search history.

AIR MANAGEMENT SYSTEM AND A METHOD FOR CONTROLLING INTAKE AIR PRESSURE AND EXHAUST BACK PRESSURE OF A FUEL CELL SYSTEM

CROSS REFERENCE TO RELATED APPLICATIONS

This application claims priority to European Patent Application No. 22168820.3, filed on Apr. 19, 2022, the disclosure and content of which is incorporated by reference herein in its entirety.

TECHNICAL FIELD

The present disclosure relates to an air management system for controlling an intake air pressure and an exhaust back pressure of a fuel cell system. It further relates to an arrangement comprising such an air management system and one or more fuel cell systems, a vehicle comprising such an arrangement, and to a method for controlling an intake air pressure and an exhaust back pressure of a fuel cell system.

The present disclosure can be applied in heavy-duty vehicles, such as trucks, buses, and construction equipment. Although the present disclosure will be described with respect to a truck, the present disclosure is not restricted to this particular vehicle, but may also be used in other vehicles such as passenger cars and off-road vehicles. The present disclosure may also be applied in vessels and in stationary applications, such as in grid-connected supplemental power generators or in grid-independent power generators.

BACKGROUND

Fuel cell systems can be used as an alternative or as a complement to electric batteries for powering of electric vehicles, but also in stationary applications such as in grid-connected and grid-independent power generators.

Fuel cells typically use hydrogen gas and oxygen from ambient air as reactants. Hydrogen gas is supplied from a hydrogen storage system, while as ambient air is used as an oxygen source. The fuel cells are sensitive to pressure changes and must typically be operated at a set pressure, or within a limited pressure range, not to risk degradation or reduction of the fuel cell lifetime. Besides, variations in pressure will affect efficiency and thereby performance of the fuel cell system. However, the ambient air pressure is subject to variations, for example depending on altitude, wherein the pressure will decrease with approximately 1 kPa per every 100 meters in elevation, compared to the normal ~101 kPa at sea level.

The reduced ambient pressure at high altitudes will limit the power output of the fuel cell system. This is particularly problematic for heavy-duty vehicles since high altitudes are often associated with steep hill climbs in which a high power capability is required. In particular, this is challenging at relatively high ambient temperatures.

Fuel cell systems are typically delivered as self-contained units including, apart from the fuel cell stack, also a control system for "balance of plant" (BoP), i.e., auxiliary components and systems such as valving, compressor, air filter, control circuitry, etc. In current solutions to the above problem, the fuel cell system may consequently be provided with a built-in pressure control system including one or more compressors and valves.

WO2021/092021 discloses such a fuel cell system including a built-in pressure control system with two air compressors, of which one is connected to a turbine.

However, there is a need for more flexible solutions for pressure control in fuel cell powered vehicles and construction machines that may be operated at high altitudes, as well as in stationary power generators and similar located at high altitudes.

SUMMARY

A primary object of the present disclosure is to provide an, in at least some aspect, improved solution for controlling air pressure of a fuel cell system operated at high altitude. In particular, it is an object to provide such a solution that is usable with a variety of different fuel cell systems.

According to a first aspect, at least the primary object is achieved by means of an air management system according to claim 1.

Thus, an air management system for controlling an intake air pressure and an exhaust back pressure of a fuel cell system is provided. The air management system comprises:
 an air pressurizing device arranged to feed intake air to an air compressor of the fuel cell system,
 a pressure regulating device arranged for regulating the exhaust back pressure,
 a pressure detection device for detecting an ambient air pressure,
 a control device configured to control the air pressurizing device and the pressure regulating device in dependence on the detected ambient air pressure, wherein the control device is configured to control the intake air pressure to a predetermined first pressure level, and to control the exhaust back pressure to a predetermined second pressure level.

By the provision of such an air management system, the intake air pressure, and the exhaust back pressure experienced by the fuel cell system may be controlled independently of the fuel cell system itself. Thus, the fuel cell system, which typically includes its own air compressor and valving, may at all times be supplied with air at a suitable pressure, such as a pressure level corresponding to normal sea level ambient pressure. Thus, the air management system serves to protect the fuel cell system and its components from undesired variations in ambient pressure. Thereby, wear of the fuel cell system components, and thereby also service needs, can be reduced.

The air management system is particularly useful in fuel cell operated vehicles, since the vehicle will experience different ambient pressures depending on current altitude. However, the air management system may also be useful for stationary fuel cell power generators and similar that are not subject to altitude variations, since it allows adaptation of a fuel cell system optimised for operation at sea level ambient pressure to operation at a high altitude, without having to alter or manipulate the fuel cell system as such. Thus, the air management system functions as an add-on system that may be used to adapt the fuel cell system to operation at high altitude.

By providing an air management system separate from the fuel cell system, it is further possible to use a single air management system for controlling air pressure intake pressure and exhaust back pressure for a plurality of fuel cell systems. This increases efficiency and simplicity in comparison to applications using several self-contained fuel cell system units. The air management system is easily scalable to simultaneously control pressure for a plurality of fuel cell systems.

The control device may preferably be separate from one or more fuel cell system control units of the fuel cell system, although it may be communicatively connected to such control units. The separate control device ensures that the air management system is free-standing from the fuel cell system and can be operated independently of the fuel cell system. When the air management system is located in a vehicle, the control device may further be communicatively connected with other control units and control systems of the vehicle.

Optionally, the control device is configured to activate the air pressurizing device and the pressure regulating device in response to the detected ambient air pressure being below a threshold value. The threshold value may be set to a value that keeps degradation and efficiency of the fuel cell system at acceptable levels. The use of a threshold prevents unnecessary use of the air management system when the pressure is at an acceptable level, i.e., above the threshold.

Optionally, the threshold value is set to a value corresponding to a normal sea level ambient pressure or less, such as to a value differing from the normal sea level ambient pressure by less than 10%, preferably by less than 5%, more preferably by less than 4%. Preferably, the value is set to be smaller than the normal sea level ambient pressure such that the air pressurizing device and the pressure regulating device are not activated due to, e.g., normal weather-related pressure variations. Threshold values of 90%, 95% and 96% of the normal sea level ambient pressure roughly correspond to altitudes of 1000 meters above sea level, 500 meters above sea level, and 400 meters above sea level, respectively. Such differences in pressure are outside of normal weather-related pressure variations.

In addition to activating the air pressurizing device when the ambient air pressure is below a threshold value, the control device may be configured to activate the air pressurizing device temporarily when a power boost is needed. For a vehicle, this may occur in a steep climb or during overtaking.

Optionally, the control device is configured to be communicatively connected to a fuel cell system control unit, wherein the threshold value is set in dependence on signals received from the fuel cell system control unit. This allows adaptation of the threshold to fuel cell characteristics. For example, the threshold may be altered as a result of fuel cell deterioration over time. The signals may be signals relating to fuel cell characteristics, such as fuel cell efficiency and temperature.

When the control device is communicatively connected to one or more fuel cell system control units, it may further or instead be configured to activate the air pressurizing device and/or the pressure regulating device in response to the fuel cell system having reached its maximum power capability at the current ambient conditions. In this way, it may on the one hand be possible to achieve a power boost by increasing at least the intake air pressure. The predetermined first and second pressure levels may herein be different. On the other hand, it is possible to compensate for a reduced ambient air pressure when signals from the fuel cell system control unit(s) reveal that the fuel cell system itself can no longer compensate for the pressure variation, in addition to detecting that the ambient air pressure is below a predetermined threshold. The fuel cell's control system will typically be able to compensate for some ambient air pressure variations, while as the air management system can be used to compensate for larger variations and longer deviations from an optimum pressure level.

Optionally, the first pressure level is equal to the second pressure level. This will usually be desirable for high altitude operation and for compensation of a reduced ambient air pressure, wherein the air management system may be used to "simulate" normal sea level ambient air pressure.

Optionally, the control device is configured to control the intake air pressure and the exhaust back pressure to a predetermined pressure level corresponding to at least a normal sea level ambient pressure, such as to a pressure level corresponding to the normal sea level ambient pressure. The normal sea level ambient pressure is the Earth's average atmospheric pressure at sea level, i.e., approximately 101 kPa.

Optionally, the first pressure level is higher than the second pressure level. This may be useful for power boosting of the fuel cell system.

Optionally, the air management system further comprises a compressed oxygen storage tank fluidly connectable to the air compressor of the fuel cell system. A controllable valve may be provided for fluidly connecting the compressed oxygen storage tank to the air compressor of the fuel cell system. Oxygen from the tank may be used to further increase the oxygen flow to the fuel cell system, in particular at high altitudes, and be used as a complement to the air pressurizing device. This is particularly useful when additional power is requested from the fuel cell system, such as during steep climbs of a vehicle powered by the fuel cell system. The additional oxygen supply may also be used to enable a faster power gradient than otherwise possible. This can be especially valuable for a fuel cell power generator that needs to follow the power demand of certain loads. For example, when provided as an off-grid generator at a construction site, activation and deactivation of various loads, such as pumps, drills, and machines, may lead to fast changes in the power demand. If the upcoming load is known, the additional oxygen supply can be precisely tuned. In comparison with using a turbo, this is a fast way of increasing the power with a less rapid pressure change, since the proportion of oxygen in the inlet air can be increased by adding oxygen from the compressed oxygen storage tank. This enrichment of the inlet air may be referred to as "oxygen boosting".

Optionally, the air management system further comprises a cooling device arranged for cooling the intake air fed from the air pressurizing device to the air compressor of the fuel cell system. This may further improve efficiency of the fuel cell system when the ambient air temperature is high since the cooling allows a higher oxygen mass flow per unit pressure.

Optionally, the air management system is further configured to determine an air density of the ambient air, wherein the control device is configured to control the air pressurizing device to provide a predetermined mass flow of oxygen to the at least one fuel cell system. This has the advantage of further stabilizing the fuel cell system operating conditions.

Optionally, the pressure regulating device comprises at least one of a valve and an expander adapted to be arranged in an exhaust outlet from the at least one fuel cell system. By providing a pressure regulating device comprising an expander, energy waste can be reduced since the expander can contribute to the driving of the air pressurizing device. By providing a pressure regulating device in the form of a valve, a less complex control system is achieved.

When the pressure regulating device comprises an expander, the expander and the air pressurizing device, such as a compressor, may in some embodiments be provided on a common shaft so that the air pressurizing device is at least partly driven by the expander. However, the expander and the air pressurizing device may also be provided as separate components, entailing a better control of the exhaust back pressure, which control is independent of the air pressurizing device.

The pressure regulating device may in some embodiments comprise both an expander and one or more valves arranged in series.

According to a second aspect of the invention, at least the primary object is achieved by an arrangement comprising at least one fuel cell system and an air management system according to the first aspect, wherein the air pressurizing device is fluidly connected to an air compressor of the at least one fuel cell system and wherein the pressure regulating device is arranged in an exhaust outlet from the at least one fuel cell system. Advantages and preferred embodiments of the second aspect largely correspond to those of the first aspect.

Optionally, the arrangement comprises two or more fuel cell systems, each fuel cell system comprising an air compressor, wherein the air pressurizing device is arranged to feed intake air to all of the two or more fuel cell systems, and/or wherein the pressure regulating device is arranged in a common exhaust outlet from the two or more fuel cell systems. A common air management system is thus used to control the intake air pressure and/or the exhaust back pressure, preferably both the intake air pressure and the exhaust back pressure, of all fuel cell systems.

According to a third aspect of the invention, at least the primary object is achieved by a vehicle comprising an arrangement according to the second aspect, wherein the at least one fuel cell system is configured for powering the vehicle. The vehicle may. e.g., be a heavy-duty vehicle such as a truck, a bus, or a construction machine. The vehicle may apart from the fuel cell system(s) comprise one or more electric batteries for powering the vehicle and for storing excess electric energy produced by the fuel cell system(s).

According to a fourth aspect of the invention, at least the primary object is achieved by a method for controlling an intake air pressure and an exhaust back pressure of a fuel cell system using an air management system according to the first aspect. The method comprises:
  detecting an ambient air pressure,
  controlling the air pressurizing device in dependence on the detected ambient air pressure to feed intake air at the predetermined first pressure level to an air compressor of the fuel cell system,
  controlling the pressure regulating device in dependence on the detected ambient air pressure to regulate the exhaust back pressure to the predetermined second pressure level.

Optionally, the air pressurizing device and the pressure regulating device are only activated in response to detecting that the ambient air pressure is below a threshold value. When the pressure regulating device is a valve, it is herein considered to be activated when controlled to a state other than a fully open state.

Optionally, the method further comprises determining an air density of the ambient air and controlling the air pressurizing device in dependence on the determined air density to provide a predetermined mass flow of oxygen to the air compressor of the fuel cell system. This will result in an even more stable operation of the fuel cell system.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
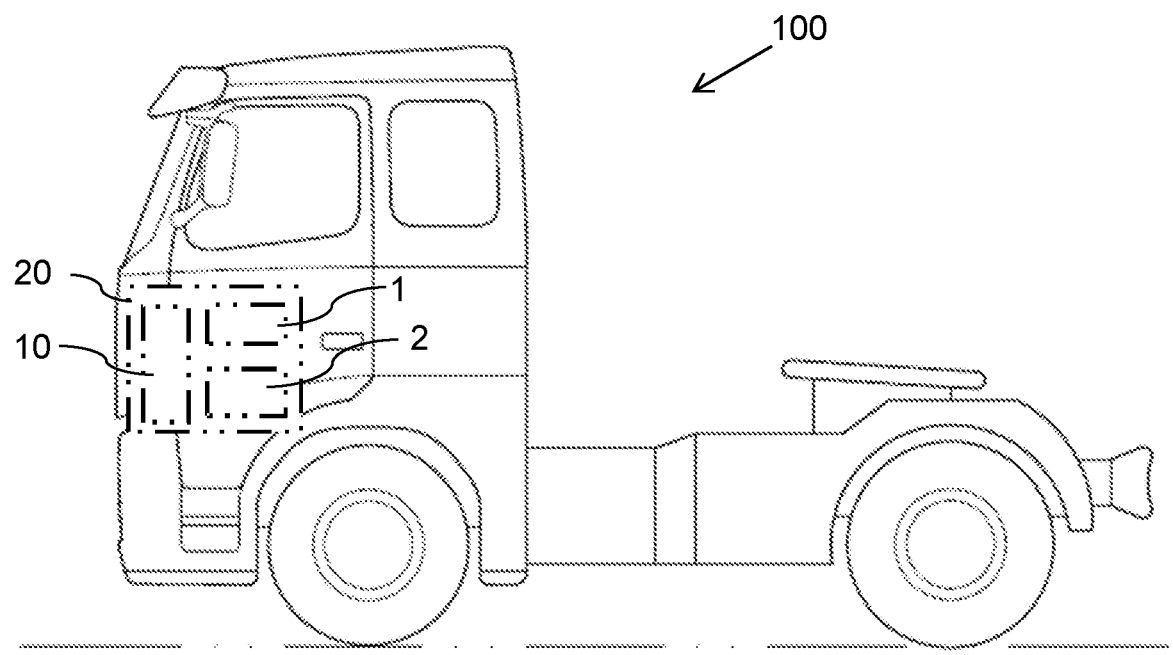
FIG. 1 is a schematic side view of a vehicle comprising an arrangement according to an embodiment of the invention.

FIG. 1 depicts a side view of a vehicle 100 according to an example embodiment. The vehicle 100 is here a truck, more specifically a heavy-duty truck for towing one or more trailers (not shown). Even though a heavy-duty truck 100 is shown it shall be noted that the invention is not limited to this type of vehicle but may be used for any other type of vehicle, such as a bus, construction equipment, e.g., a wheel loader and an excavator, and a passenger car.

The vehicle comprises an arrangement 20 including two fuel cell systems 1, 2 for powering one or more electric motors (not shown), which are used for creating a propulsion force to the vehicle 100. The arrangement 20 may additionally or alternatively be used for powering other electric power consumers of the vehicle 100, such as an electric motor for a refrigerator system, an electric motor for an air conditioning system, or any other electric power consuming function of the vehicle 100. The vehicle 100 may further comprise an electrical energy storage unit (not shown), to which the fuel cell systems 1, 2 are electrically connected so that power generated by the fuel cell systems 1, 2 can be stored in the electrical energy storage unit. The electrical energy storage unit may comprise one or more batteries, such as one or more Li-ion batteries. The vehicle 100 may further comprise power electronics (not shown) for converting electric energy as necessary within the vehicle 100. Such power electronics may, e.g., include a DC/DC converter.

A hydrogen fuel storage system (not shown), such as a hydrogen fuel tank, may also be provided onboard the vehicle 100, for supplying hydrogen fuel to an anode side of the respective fuel cell system 1, 2. The fuel cell systems 1, 2 are configured for reaction of hydrogen fuel ($H_2$) with oxygen from ambient air to generate electric current.

The arrangement 20 comprises an air management system 10 for controlling an intake air pressure and an exhaust back pressure of the fuel cell systems 1, 2, i.e., a pressure of intake air fed to a cathode side of the respective fuel cell system 1, 2. Such an air management system 10 is illustrated in greater detail in FIG. 2, wherein it forms part of an arrangement 20 comprising a single fuel cell system 1.

The air management system 10 comprises an air pressurizing device 3 arranged to feed intake air to an air compressor (not shown) provided at the cathode side of the fuel cell system 1. The air pressurizing device 3 may be a fan or a compressor, such as an electrically driven compressor. It may preferably be a radial compressor, generally allowing larger compression ratios than axial compressors, although an axial compressor or a displacement compressor, such as a Roots blower, may also be used. The air pressurizing device 3 may also be an axial fan arranged in an air intake duct of the air management system 10. The air pressurizing device 3 is fluidly connected to an ambient air intake. Herein, an optional air filter 8 is provided upstream of the air pressurizing device 3.

The air management system 10 further comprises a controllable pressure regulating device 4, herein in the form of a valve 4, arranged for regulating the exhaust back pressure of the fuel cell system 1. The valve 4 may be referred to as a back-pressure valve or a cathode exhaust valve since it is mounted in an exhaust pipe from the fuel cell system 1. The valve 4 may, by way of example only, be a butterfly valve or an iris valve.

Instead of a valve 4, or in addition to the valve 4, an expander (not shown) may be provided, such as a radial or axial turbine, e.g., a variable turbine, or a displacement expander. The expander should be arranged in the exhaust pipe from the fuel cell system 1, such as upstream of the valve 4. It is also possible to provide additional valving, such as a bypass valve for bypassing the expander in some operational modes. In some embodiments, the expander may be arranged downstream of the valve 4.

A pressure detection device 5 is provided for detecting an ambient air pressure of air surrounding the fuel cell system 1, such as surrounding a vehicle 100 if the fuel cell system 1 is provided in the vehicle. The pressure detection device may be a pressure sensor or a virtual pressure sensor, i.e., a device configured to determine the air pressure based on other measured data. The pressure detection device 5 may also be a device configured to determine the air pressure based on position and/or map data, or based on cloud data from other nearby vehicles.

An electronic control device 6 configured to control the air pressurizing device 3 and the pressure regulating device 4 in dependence on the detected ambient air pressure, is also provided. The control device 6 may be communicatively connected to the pressure detection device 5, e.g., when the pressure detection device 5 is a pressure sensor. The control device 6 may also be integral with the pressure detection device, such as being configured to determine the pressure based on data received from other units than from a pressure sensor as described above. The control device 6 is configured to control the air pressurizing device 3 so that the intake air pressure to the fuel cell system 1 is at a predetermined first pressure level, and to control the pressure regulating device 4 so that the exhaust back pressure is at a predetermined second pressure level. The first and second pressure levels may be the same, or different, depending on an operational mode of the air management system 10.

The control device 6 may comprise processing circuitry which is adapted to run a computer program comprising program code means for performing methods disclosed herein. The control device 6 may comprise hardware and/or software for performing such methods. In an embodiment, the control device 6 may be denoted a computer. The control device 6 may be constituted by one or more separate sub-control devices. In addition, the control device 6 may communicate by use of wired and/or wireless communication means, e.g., with sensors, other control unit(s), etc. For example, the control device 6 may, when the air management system 10 is provided in a vehicle 100, be provided on-board the vehicle 100, and/or at least partly remotely from the vehicle 100. The control device 6 may be configured to control the air management system 10 by issuing control signals and by receiving status information from the various parts of the air management system 10, and optionally from other control units, such as of the fuel cell system 1 and/or of the vehicle 100.

The fuel cell system 1, 2 may comprise its own electronic control unit(s) (not shown), which may be communicatively connected to the control device 6. In a vehicle application, the fuel cell control unit or units is/are configured for delivering power from the fuel cell system 1, 2 according to a power request received from a vehicle control unit. Although possibly communicatively connected thereto, the control device 6 is provided separately from such control unit(s) of the fuel cell system 1, 2. The control device 6 is thereby not configured to control operation of the fuel cell system 1, 2 itself.

The air management system 10 may further be configured to determine an air density of the ambient air, for example by detecting air humidity and ambient temperature in addition to the pressure detection described above. Those variables may be measured directly using sensors or determined based on other measured data using models, and/or based on cloud data from other nearby vehicles. Weather data may also be used for predicting the air humidity. The control device 6 may in this case be configured to control the air pressurizing device 3 to provide a predetermined mass flow of oxygen to the fuel cell system 1, 2.

The air management system 10 may be provided with different modes of operation, such as a compensation mode of operation in which the air management system 10 is arranged to compensate for a relatively low ambient air pressure, and a power mode of operation in which the air management system 10 is arranged to provide conditions for temporarily increasing the output power from the fuel cell system 1. The modes of operation may be selectable by an operator of the vehicle 100, or automatically triggered in response to some external condition being fulfilled. For example, the compensation mode of operation may be automatically triggered when an ambient air pressure below a threshold is detected.

In the compensation mode of operation, the air management system 10 is arranged to compensate the relatively low ambient air pressures at high altitudes. In this mode, the control device 6 may be configured to activate the air pressurizing device 3 and the valve 4 in response to the detected ambient air pressure being below a threshold value, such as the threshold that automatically triggers the compensation mode of operation. The threshold value could be set to a fixed value slightly lower than a normal sea level ambient pressure, such as to a predetermined value differing from the normal sea level ambient pressure by less than 10%, preferably by less than 5%, more preferably by less than 4%. The predetermined value may thus, by way of example, be set to a value within the range of 90%-100% of the normal sea level ambient pressure. The predetermined threshold may, by way of example, be set such that a normal variation occurring due to weather conditions is allowed without activating the air pressurizing device 3 and the pressure regulating device 4.

In the compensation mode of operation, the first pressure level may be equal to the second pressure level, i.e., the air pressurizing device 3 and the pressure regulating device 4 are controlled to provide the same pressures. The control device 6 may herein be configured to control the intake air pressure and the exhaust back pressure to a predetermined pressure level corresponding to the normal sea level ambient pressure or higher, or even lower, depending on the optimum working pressure of the fuel cell system 1. Thus, the air management system 10 may in the compensation mode of operation provide an intake air pressure and an exhaust back pressure at the normal sea level ambient pressure for any detected ambient air pressure below the predetermined threshold level.

In another embodiment, the control device 6 may use signals from the control unit of the fuel cell system 1, 2 to determine when to activate the air pressurizing device 3 and the pressure regulating device 4, such as the valve 4. For example, the control device 6 may be configured to activate the air pressurizing device 3 and the pressure regulating device 4 only when the signals received from the fuel cell system control unit indicate that the fuel cell system 1, 2 can no longer compensate for the reduced ambient air pressure on its own. At this point, the air pressurizing device 3 and the pressure regulating device 4 are activated and used for compensating the reduced ambient air pressure as described above.

In yet another embodiment, the control device 6 may in the compensation mode of operation be configured to activate the air pressurizing device 3 and the pressure regulating device 4 in response to the detected ambient air pressure being below a threshold value, wherein the threshold value is a "moving threshold" set in dependence on fuel cell characteristics, such as fuel cell efficiency, air temperature, fuel cell power demand, fuel cell maximum power level, air filter pressure drop, etc. The fuel cell maximum power level will likely decrease during ageing of the fuel cell system, while as the pressure drop across an air filter of the fuel cell system 1, 2 or of the air management system 10 will increase over time as dust is accumulated in the air filter.

In the power mode of operation, the air management system 10 may be used for increasing at least the intake air pressure beyond the normal sea level ambient pressure during a short period of time when a relatively high output power is requested from the fuel cell system 1, 2. The power mode of operation may be triggered for example when a power request above a threshold level is detected by the control device 6. Thus, it may be triggered when the compensation mode of operation is active. In this case, the power mode of operation may be temporarily activated, and the compensation mode of operation is immediately resumed when the power mode of operation is ceased. The intake air pressure and the exhaust back pressure of the fuel cell system 1, 2 may in the power mode of operation be controlled to different pressure levels, i.e., the first pressure level may differ from the second pressure level. Typically, the first pressure level may be higher than the second pressure level. However, both the first and the second pressure levels may be set to values higher than the normal sea level ambient pressure.

Figure 2:
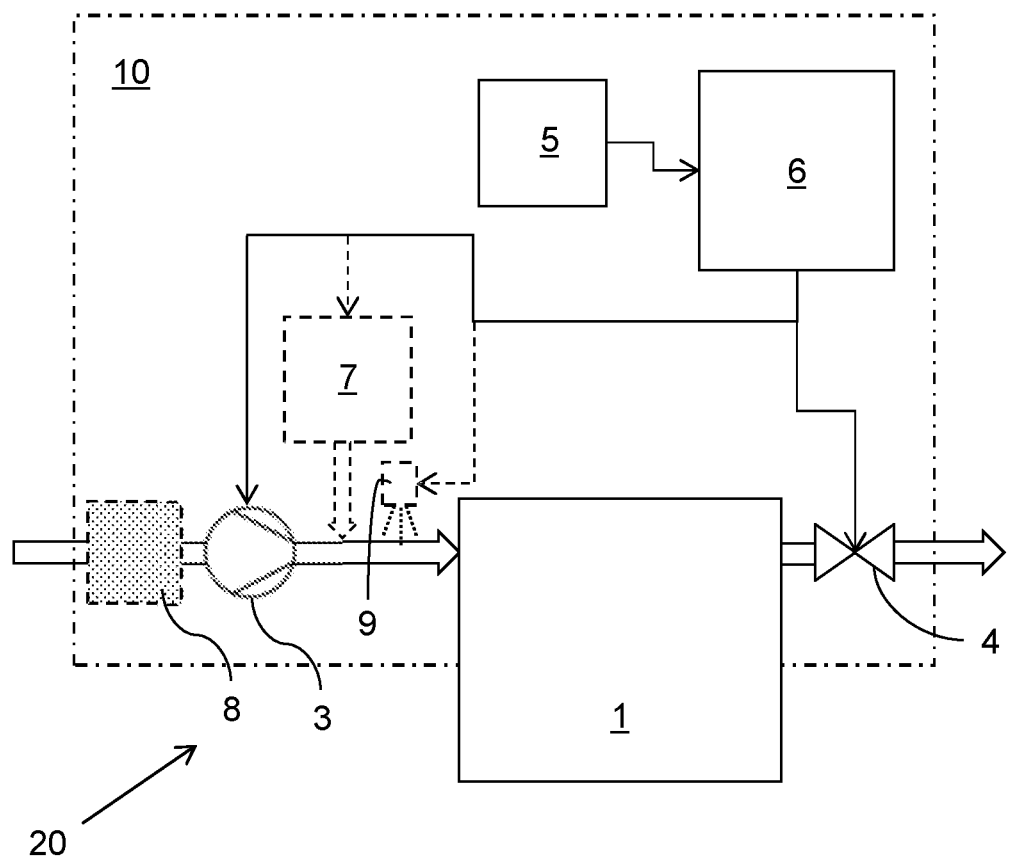
FIG. 2 is a schematic overview of an air management system according to an embodiment of the invention.

As indicated by dashed lines in FIG. 2, the air management system 10 may further comprise an air filter 8 placed upstream of the air pressurizing device 3 for filtering ambient intake air. It may also comprise a compressed oxygen storage tank 7 fluidly connectable to the air compressor of the fuel cell system 1, 2, such as downstream of the air pressurizing device 3. The compressed oxygen storage tank 7 may be used for providing additional oxygen to the fuel cell system 1, 2, for example in an oxygen enriched mode of operation. It can be controlled by the control device 6 to provide additional oxygen as a complement to the increased pressure achieved by the air pressurizing device 3 and the pressure regulating device 4.

The air management system 10 may further comprise a cooling device 9 arranged for cooling the intake air fed from the air pressurizing device 3 to the air compressor of the fuel cell system 1, 2. The cooling device 9 is herein illustrated as a water injection device, which has the advantage of providing additional humidity to the intake air. The water may, in some embodiments, be condensate received from a cathode outlet of the fuel cell system 1, 2. With water injection, the air management system 10 may be used to provide conditions for the fuel cell system 1 similar to those experienced during a humid day at sea level.

The cooling device 9 may alternatively be in the form of a heat exchanger, either directly cooled by ambient air or cooled indirectly by vehicle coolant. The cooling device 9 may, e.g., be an intercooler or a charge air cooler (CAC). In any case, the cooling device 9 may be controllable by the control device 6.

Figure 3:
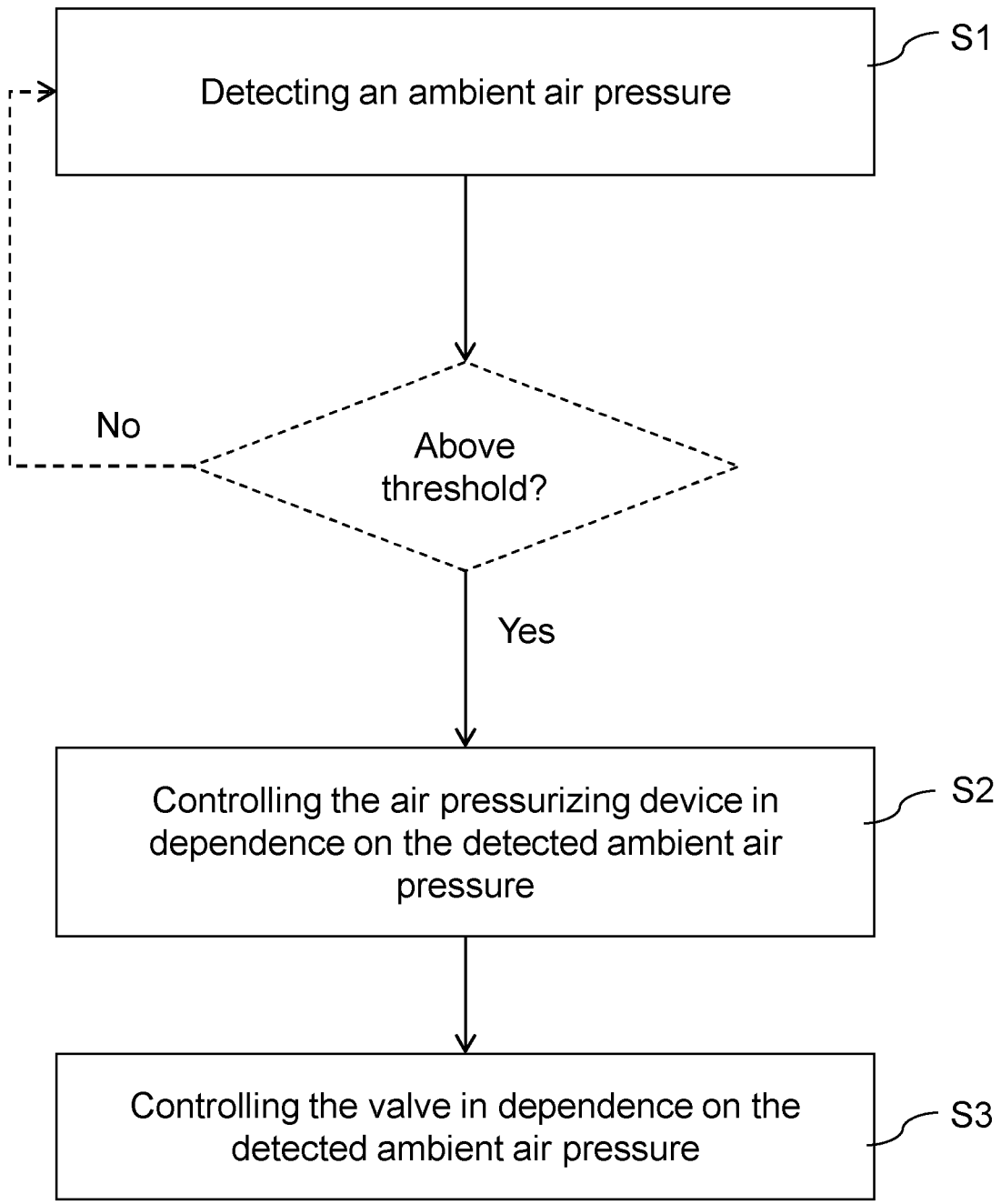
FIG. 3 is a flow-chart illustrating a method according to the invention.

FIG. 3 illustrates a method for operating the air management system 10 according to an embodiment of the invention. The method may be carried out by the control device 6 by issuing control signals to the relevant parts of the air management system 10.

In a first step S1, an ambient air pressure is detected by the pressure detection device 5.

In a second step S2, the air pressurizing device 3 is controlled in dependence on the detected ambient air pressure to feed intake air at the predetermined first pressure level to the air compressor of the fuel cell system 1, 2.

In a third step S3, the pressure regulating device 4 is controlled in dependence on the detected ambient air pressure to regulate the exhaust back pressure to the predetermined second pressure level.

The air pressurizing device 3 and the pressure regulating device 4 may in some embodiments only be activated in response to detecting that the ambient air pressure is below a threshold value, as indicated by the dashed box in FIG. 3. This is particularly applicable in the compensation mode of operation described above. If the air pressure is below the threshold value, monitoring of the ambient pressure in step S1 continues without activating the air pressurizing device 3 and the pressure regulating device 4.

In correspondence with the above description of the air management system 10, the method may also comprise receiving signals from a fuel cell system control unit and setting the threshold value in dependence on those signals.

The method may further comprise determining an air density of the ambient air and controlling the air pressurizing device 3 in dependence on the determined air density to provide a predetermined mass flow of oxygen to the air compressor of the fuel cell system 1, 2. When the air management system 10 comprises a compressed oxygen storage tank 7, the method may further comprise controlling a supply of oxygen from the oxygen storage tank 7 to the air compressor of the fuel cell system 1, 2 based on the detected ambient air pressure and/or on signals received from the fuel cell system control unit.

When the air management system 10 comprises a cooling device 9 arranged for cooling the intake air fed from the air pressurizing device 3 to the air compressor of the fuel cell system 1, 2, the method may further comprise operating the cooling device 9 in dependence on the detected ambient air pressure and/or on signals received from the fuel cell system control unit.

It is to be understood that the present disclosure is not limited to the embodiments described above and illustrated in the drawings; rather, the skilled person will recognize that many changes and modifications may be made within the scope of the appended claims.

The invention claimed is:

1. An air management system for controlling an intake air pressure and an exhaust back pressure of a fuel cell system, the air management system comprising:
   an air pressurizing device arranged to feed intake air to an air compressor of the fuel cell system;
   a pressure regulating device arranged for regulating the exhaust back pressure;
   a pressure detection device for detecting an ambient air pressure; and
   a control device configured to control the air pressurizing device and the pressure regulating device in dependence on the detected ambient air pressure, wherein the control device is configured to control the intake air pressure to a predetermined first pressure level, and to control the exhaust back pressure to a predetermined second pressure level.

2. The air management system according to claim 1, wherein the control device is separate from one or more fuel cell system control units of the fuel cell system.

3. The air management system according to claim 1, wherein the control device is configured to activate the air pressurizing device and the pressure regulating device in response to the detected ambient air pressure being below a threshold value.

4. The air management system according to claim 3, wherein the threshold value is set to a value corresponding to a normal sea level ambient pressure or less, such as to a value differing from the normal sea level ambient pressure by less than 10%.

5. The air management system according to claim 3, wherein the threshold value is set to a value corresponding to a normal sea level ambient pressure or less, such as to a value differing from the normal sea level ambient pressure by less than 5%.

6. The air management system according to claim 3, wherein the threshold value is set to a value corresponding to a normal sea level ambient pressure or less, such as to a value differing from the normal sea level ambient pressure by less than 4%.

7. The air management system according to claim 3, wherein the control device is configured to be communicatively connected to a fuel cell system control unit, and wherein the threshold value is set in dependence on signals received from the fuel cell system control unit.

8. The air management system according to claim 1, wherein the first pressure level is equal to the second pressure level.

9. The air management system according to claim 8, wherein the control device is configured to control the intake air pressure and the exhaust back pressure to a predetermined pressure level corresponding to at least a normal sea level ambient pressure, such as to a pressure level corresponding to the normal sea level ambient pressure.

10. The air management system according to claim 1, wherein the first pressure level is higher than the second pressure level.

11. The air management system according to claim 1, further comprising a compressed oxygen storage tank fluidly connectable to the air compressor of the fuel cell system.

12. The air management system according to claim 1, further comprising a cooling device arranged for cooling the intake air fed from the air pressurizing device to the air compressor of the fuel cell system.

13. The air management system according to claim 1, wherein the pressure regulating device comprises at least one of a valve and an expander adapted to be arranged in an exhaust outlet from the at least one fuel cell system.

14. An arrangement comprising at least one fuel cell system and an air management system according to claim 1, wherein the air pressurizing device is fluidly connected to an air compressor of the at least one fuel cell system and wherein the pressure regulating device is arranged in an exhaust outlet from the at least one fuel cell system.

15. The arrangement according to claim 14, wherein the arrangement comprises two or more fuel cell systems, each fuel cell system comprising an air compressor, and wherein the air pressurizing device is arranged to feed intake air to all of the two or more fuel cell systems, and/or wherein the pressure regulating device is arranged in a common exhaust outlet from the two or more fuel cell systems.

16. A vehicle comprising an arrangement according to claim 14, wherein the at least one fuel cell system is configured for powering the vehicle.

17. The vehicle according to claim 16, wherein the arrangement comprises two or more fuel cell systems, each fuel cell system comprising an air compressor, and wherein the air pressurizing device is arranged to feed intake air to all of the two or more fuel cell systems, and/or wherein the pressure regulating device is arranged in a common exhaust outlet from the two or more fuel cell systems.

18. A method for controlling an intake air pressure and an exhaust back pressure of a fuel cell system using an air management system according to claim 1, the method comprising:
   detecting an ambient air pressure;
   controlling the air pressurizing device in dependence on the detected ambient air pressure to feed intake air at the predetermined first pressure level to an air compressor of the fuel cell system; and
   controlling the pressure regulating device in dependence on the detected ambient air pressure to regulate the exhaust back pressure to the predetermined second pressure level.

19. The method according to claim 18, wherein the air pressurizing device and the pressure regulating device are only activated in response to detecting that the ambient air pressure is below a threshold value.

20. The method according to claim 18, further comprising determining an air density of the ambient air and controlling the air pressurizing device in dependence on the determined air density to provide a predetermined mass flow of oxygen to the air compressor of the fuel cell system.

* * * * *